United States Patent [19]

Ikeda et al.

[11] Patent Number: 5,063,563

[45] Date of Patent: Nov. 5, 1991

[54] COMMUNICATION TERMINAL HAVING MEANS FOR CONTROLLING POWER TRANSFER

[75] Inventors: Koji Ikeda, Kawasaka; Mikio Nakayama, Tokyo, both of Japan

[73] Assignee: Fujitsu Limited, Kanagawa, Japan

[21] Appl. No.: 578,358

[22] Filed: Sep. 6, 1990

[30] Foreign Application Priority Data

Sep. 14, 1989 [JP]  Japan .................................. 1-238722

[51] Int. Cl.$^5$ ................................................ H04J 3/12
[52] U.S. Cl. ................................ 370/110.1; 370/94.1; 379/26; 379/1; 379/32
[58] Field of Search ................ 370/110.1, 94.1; 379/1, 379/26, 32, 33

[56] References Cited

U.S. PATENT DOCUMENTS

| 3,934,089 | 1/1926 | Stewart | 370/71 |
| 4,025,729 | 5/1977 | Stone | 370/71 |
| 4,514,594 | 4/1985 | Brown | 379/65 |
| 4,961,185 | 10/1990 | Sawrada | 370/110.1 |
| 4,996,526 | 2/1991 | DeLuca | 455/343 |

FOREIGN PATENT DOCUMENTS 225666 12/1984 Japan .
78093 3/1989 Japan .
144847 6/1989 Japan .

Primary Examiner—Douglas W. Olms
Assistant Examiner—T. Samuel
Attorney, Agent, or Firm—Helfgott & Karas

[57] ABSTRACT

A communication terminal is coupled to a communication network via transmitting and receiving signal lines and a switching system. The communication terminal includes a power input line coupled to the transmitting and receiving signal lines, a power sink for supplying power, a switch coupled between the power input line and the power sink, a hook switch coupled between the power input line and the power sink in parallel to the switch, a detection circuit coupled to the receiving signal line for detecting a signal on the receiving signal line, a state maintaining circuit coupled to the switch and the detection circuit for closing the switch and for maintaining the switch in a closed state by carrying out a state maintaining operation when a signal is detected by the detection circuit, and a prohibit circuit coupled to the detection circuit for prohibiting a signal detection of the detection circuit.

31 Claims, 14 Drawing Sheets

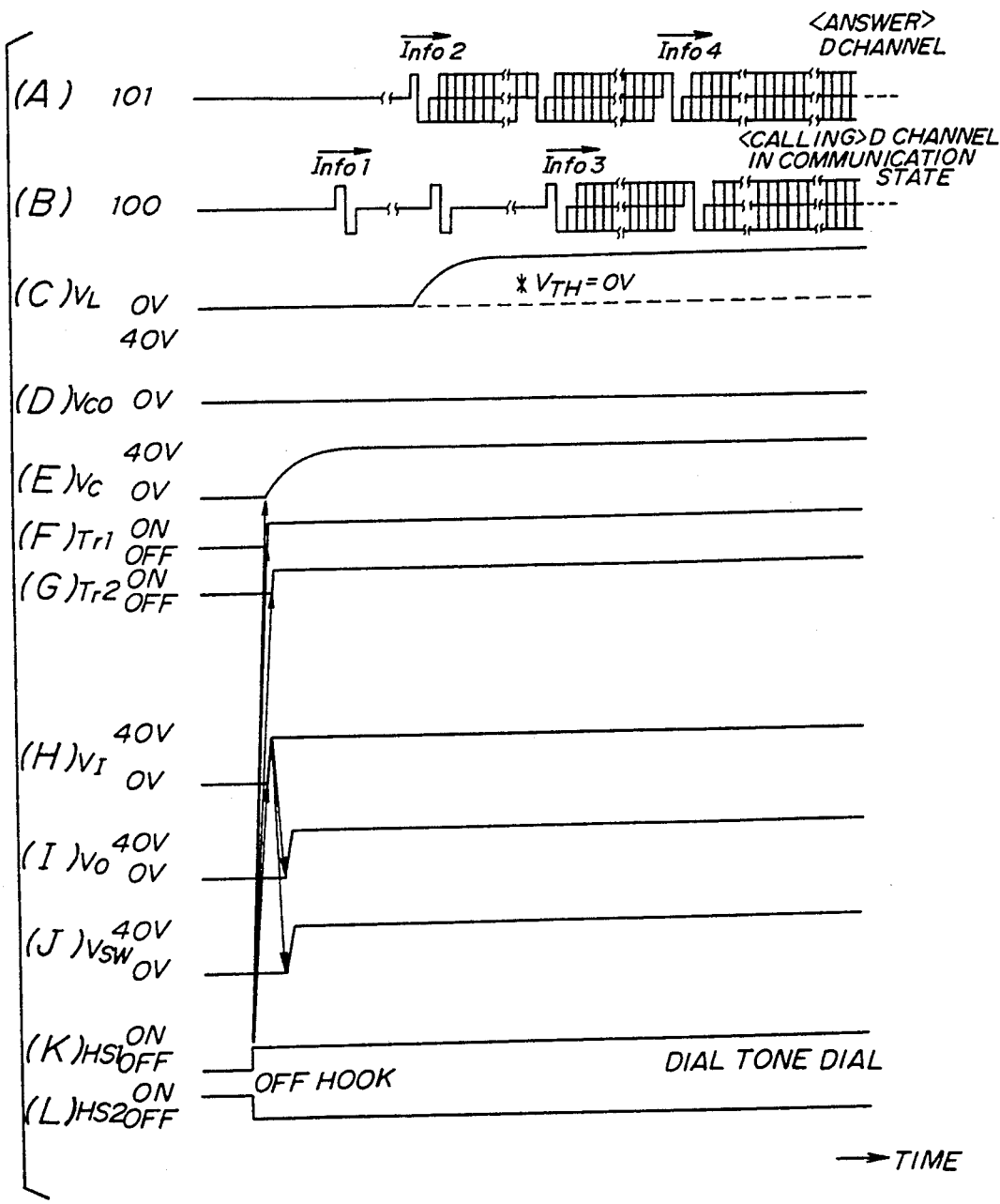

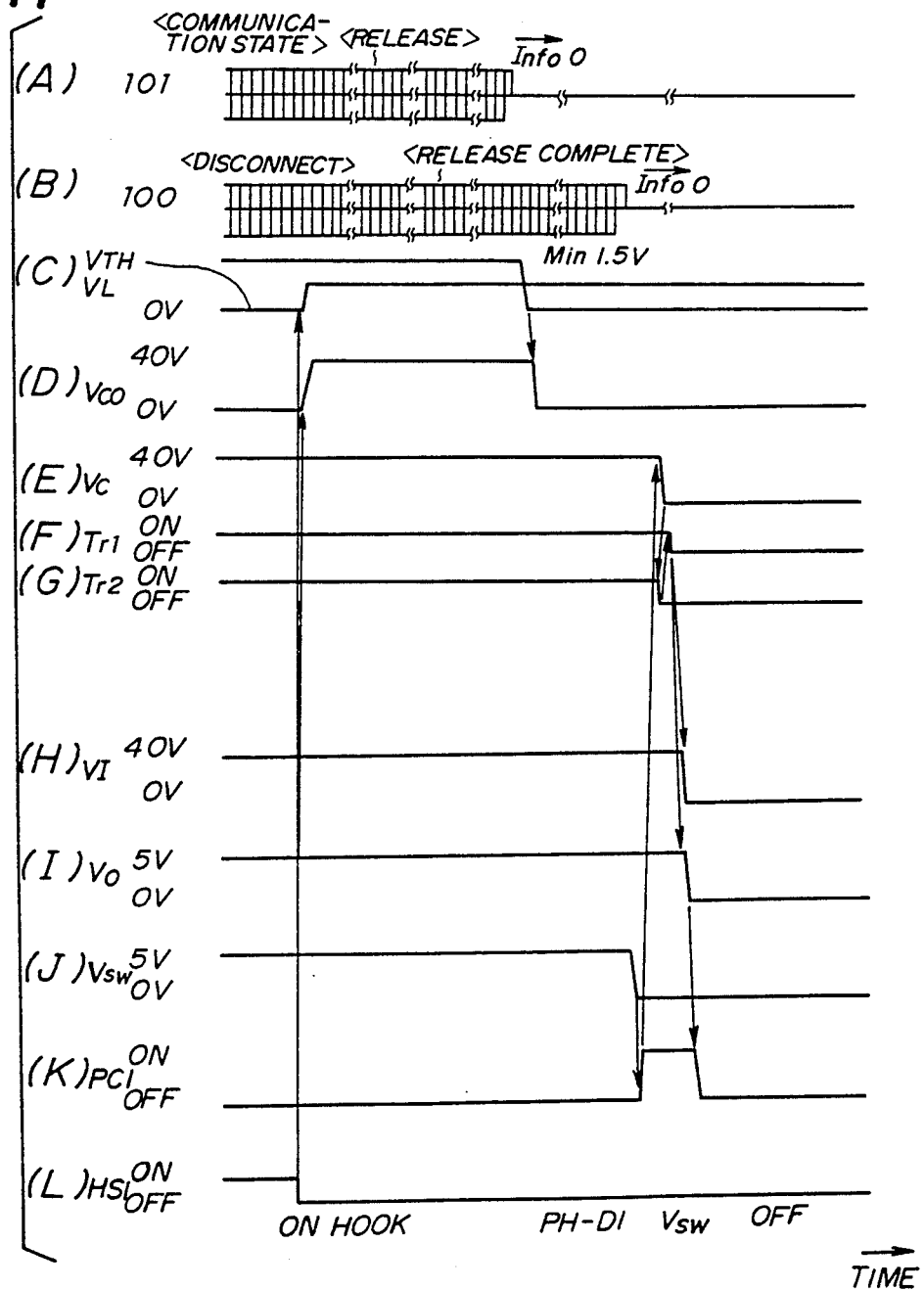

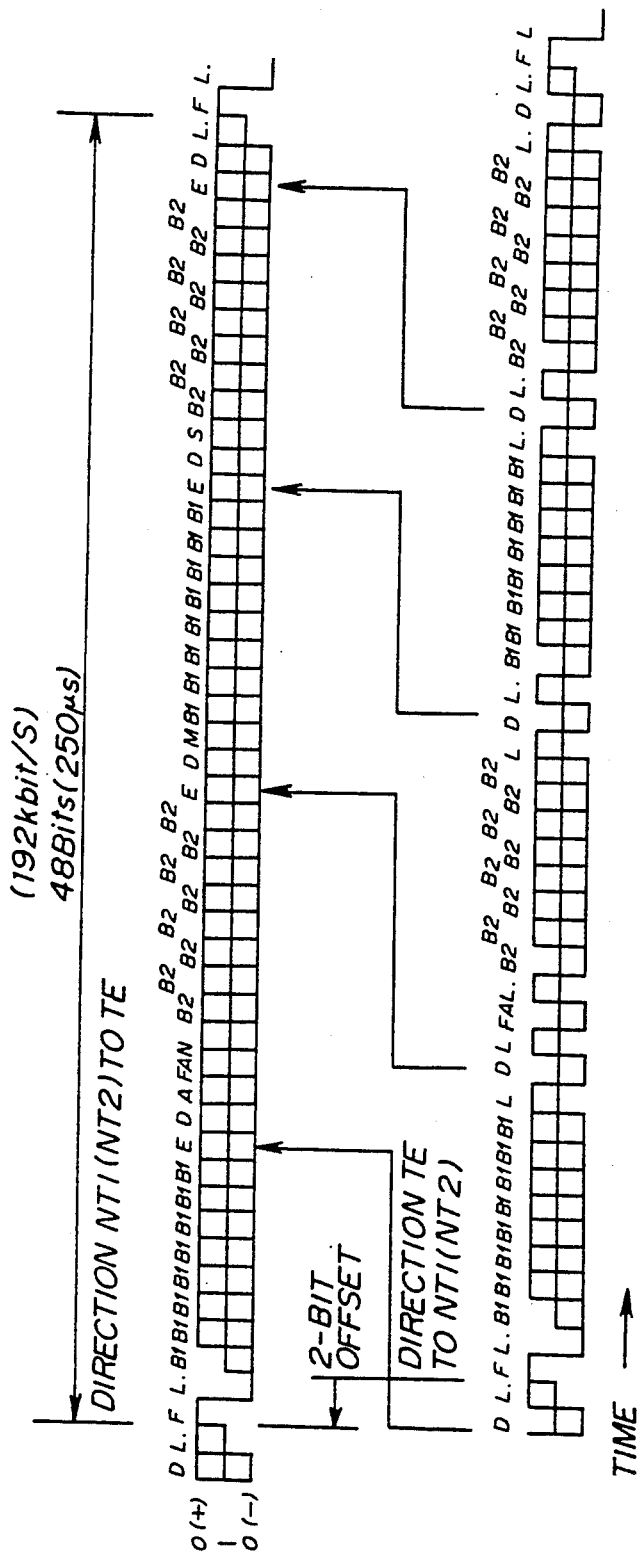

FIG.14

| SIGNAL IN DIRECTION NT1(NT2) TO TE | | SIGNAL IN DIRECTION TE TO NT1(NT2) | |
|---|---|---|---|
| Info 0 | NO SIGNAL | Info 0 | NO SIGNAL |
| Info 2 | FRAME IN WHICH ALL BITS OF B, D & D-ECHO-CHANNELS ARE SET TO BINARY "0". BIT A IS SET TO BINARY "0". N & L BITS COMPLY WITH CODING RULE. | Info 1 | CONTINUOUS SIGNAL SHOWN BELOW INCLUDING POSITIVE BINARY "0", NEGATIVE BINARY "0" & BINARY "1". <br><br> 0 0 1 1 1 1 1 1 0 0 1 1 1 <br><br> NOMINAL BIT RATE =192Kbit/s |
| Info 4 | FRAME IN WHICH GENERAL DATA IS INCLUDED IN B, D & D-ECHO CHANNELS | Info 3 | SYNC FRAME IN WHICH GENERAL DATA IS INCLUDED IN B & D CHANNELS |

COMMUNICATION TERMINAL HAVING MEANS FOR CONTROLLING POWER TRANSFER

BACKGROUND OF THE INVENTION

The present invention generally relates to communication terminals, and more particularly to a communication terminal which controls power transfer and is suited for application to an integrated services digital network (ISDN) terminal.

An ISDN provides a plurality of different communication services such as telephone, data, facsimile and image communications by use of a communication network including a digital switching system and digital transmission lines. In the ISDN, when a power down occurs on the network (switching system) side, restricted power with a polarity which is inverted from a normal power is supplied from the network side.

FIG. 1 shows an example of a conventional ISDN. A plurality of ISDN terminals TE are coupled to an ISDN switching system EX via network terminator devices (or digital service units) NT1 and NT2. The network terminator device NT1 and NT2 include functions for making subscriber's line termination, layer 1 maintenance, monitoring, power transfer, layer 1 multiplexing, interface termination, protocol processes of layers 2 and 3, layer 2 multiplexing, layer 3 multiplexing, and interface termination.

FIG. 2 shows an example of a conventional ISDN terminal. A transmission signal line 100 is coupled to a frame disassembly/assembly part 105 of a line interface part 104 via a transformer T1 and drivers 102. A receiving signal line 101 is coupled to the frame disassembly/assembly part 105 of the line interface part 104 via a transformer T2 and receivers 103. The frame disassembly/assembly part 105 disassembles/assembles the B1 and B2 channels and the D channel within 2B+D. The D channel is transmitted and received between a central processing unit (CPU) interface 106 of the line interface part 104 and each of a CPU 108, a random access memory (RAM) 109 and a read only memory (ROM) 110 via a data bus 107. The B1 and B2 channels are transmitted and received between a B channel selector 111 of the line interface part 104 and a handset 115 via a coder/decoder 112, a sending amplifier 113 and a receiving amplifier 114. A dialing part 119 is connected to the CPU 108.

On the other hand, the signal lines 100 and 101 are coupled to a power input line 117 via a diode bridge 116, and the power input line 117 is coupled to internal circuits via a power sink 118 and a power input line 219. The power is supplied to the power sink 118 regardless of whether or not the ISDN terminal is carrying out a communication.

For example, there are cases where a plurality of terminals having no local power supply are connected to the communication network via the switching system and cases where the local power supply is down. In such cases, when the plurality of terminals simultaneously require the power supply from the switching system side, the switching system in conformance with a communication standard can only supply 400 mW per subscriber's line. As a result, there are problems in that the load on the network side increases and the terminal side cannot operate in some cases. In other words, according to this communication standard, one terminal is only supplied with a power of 380 mW from the switching system side so that the remaining 20 mW can be supplied to other terminals to enable at least a terminal to detect a call. However, since the terminal supplied with the power of 380 mW constantly operates a detection circuit for detecting the call, considerable power is consumed by the detection circuit and the power supplied to internal circuits of this terminal is reduced thereby. Therefore, there is a demand to fully utilize the limited power supplied to the terminal from the switching system side.

SUMMARY OF THE INVENTION

Accordingly, it is a general object of the present invention to provide a novel and useful communication terminal in which the problems described above are eliminated.

Another and more specific object of the present invention is to provide a communication terminal which is coupled to a communication network via transmitting and receiving signal lines and a switching system, comprising a power input line coupled to the transmitting and receiving signal lines, a power sink for supplying power, switching means coupled between the power input line and the power sink, a hook switch coupled between the power input line and the power sink in parallel to the switching means, detection circuit means coupled to the receiving signal line for detecting a signal on the receiving signal line, state maintaining circuit means coupled to the switching means and the detection circuit means for closing the switching means and for maintaining the switching means in a closed state by carrying out a state maintaining operation when a signal is detected by the detection circuit means, and prohibit circuit means coupled to the detection circuit means for prohibiting a signal detection of the detection circuit means. According to the communication terminal of the present invention, it is possible to suppress the power consumption to a minimum when a power down occurs, so as to reduce the load on the network (switching system) side. In addition, it is possible to reduce the capacity of the power source on the switching system side.

Still another object of the present invention is to provide a communication terminal which is coupled to a communication network via transmitting and receiving signal lines and a switching system, comprising a power input line coupled to the transmitting and receiving signal lines, a power sink coupled to the power input line for supplying power from an output side thereof, switching means coupled to the output side of the power sink, a hook switch coupled to the output side of the power sink in parallel to the switching means, detection circuit means coupled to the receiving signal line for detecting a signal on the receiving signal line, state maintaining circuit means coupled to the switching means and the detection circuit means for closing the switching means and for maintaining the switching means in a closed state by carrying out a state maintaining operation when a signal is detected by the detection circuit means, and prohibit circuit means coupled to the detection circuit means for prohibiting a signal detection of the detection circuit means. According to the communication terminal of the present invention, it is possible to suppress the power consumption to a minimum when a power down occurs, so as to reduce the load on the network (switching system) side. In addition, it is possible to reduce the capacity of the power source on the switching system side.

Other objects and further features of the present invention will be apparent from the following detailed description when read in conjunction with the accompanying drawings.

BRIEF DESCRIPTION OF THE DRAWINGS

FIG. 7 is a timing chart showing various timings when the ISDN terminal is calling;

FIG. 11 is a timing chart showing various timings when the disconnection is made from the ISDN terminal side;

FIG. 13 shows the structure of one frame of layer 1;

FIG. 14 is a diagram for explaining the definition of the signal Info;

DESCRIPTION OF THE PREFERRED EMBODIMENTS

Figure 1:
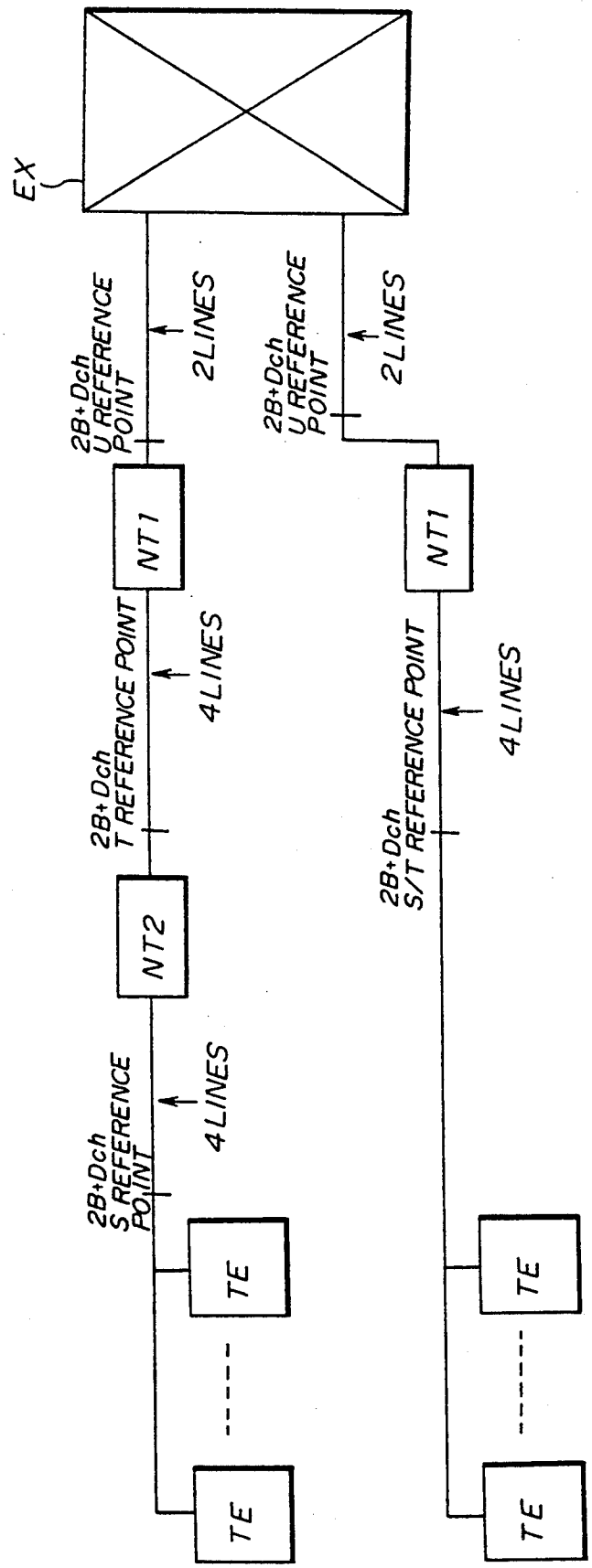
FIG. 1 is a system block diagram showing an example of a conventional ISDN.
Figure 2:
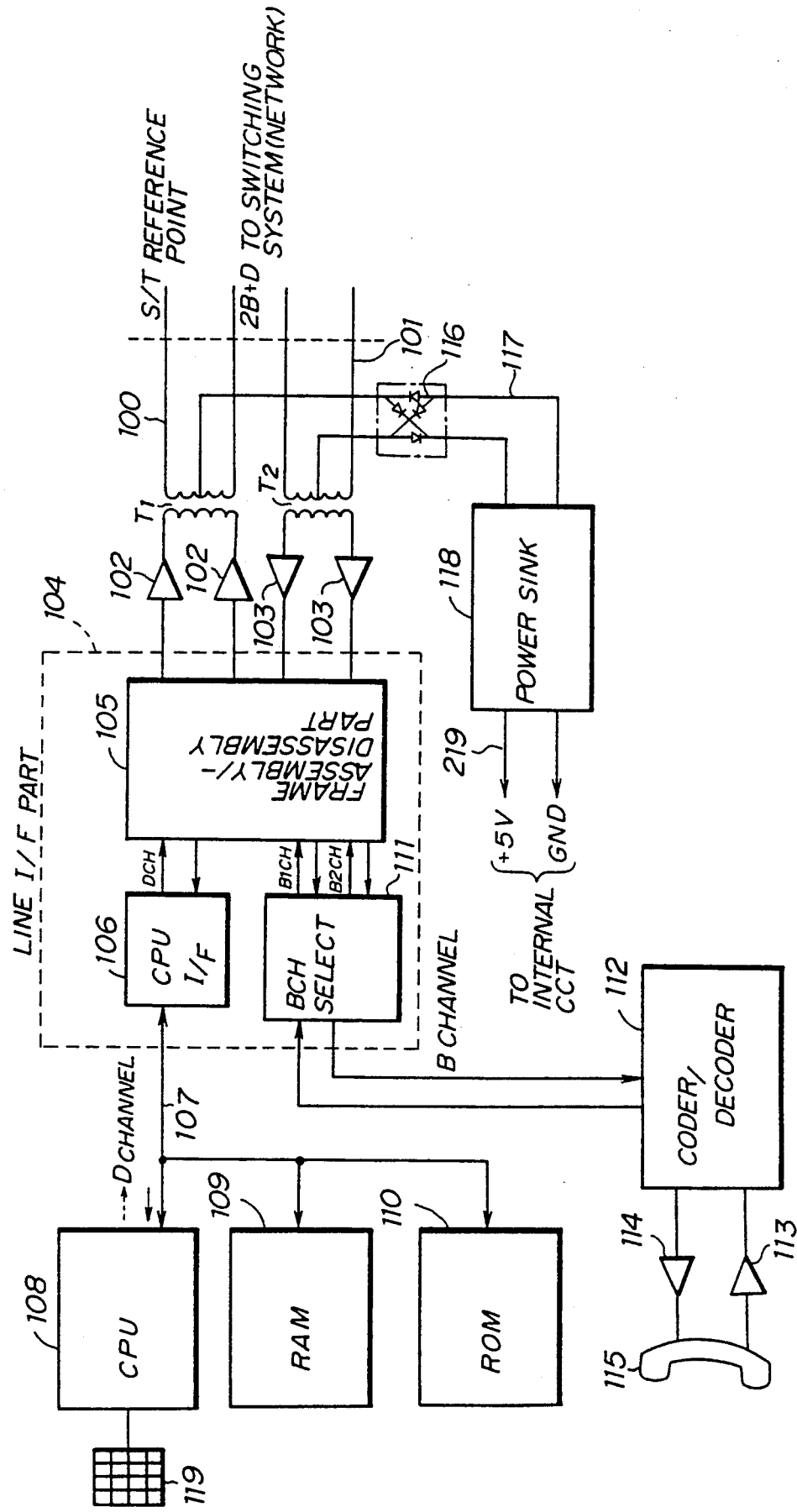
FIG. 2 is a system block diagram showing an example of a conventional ISDN terminal.
Figure 3:
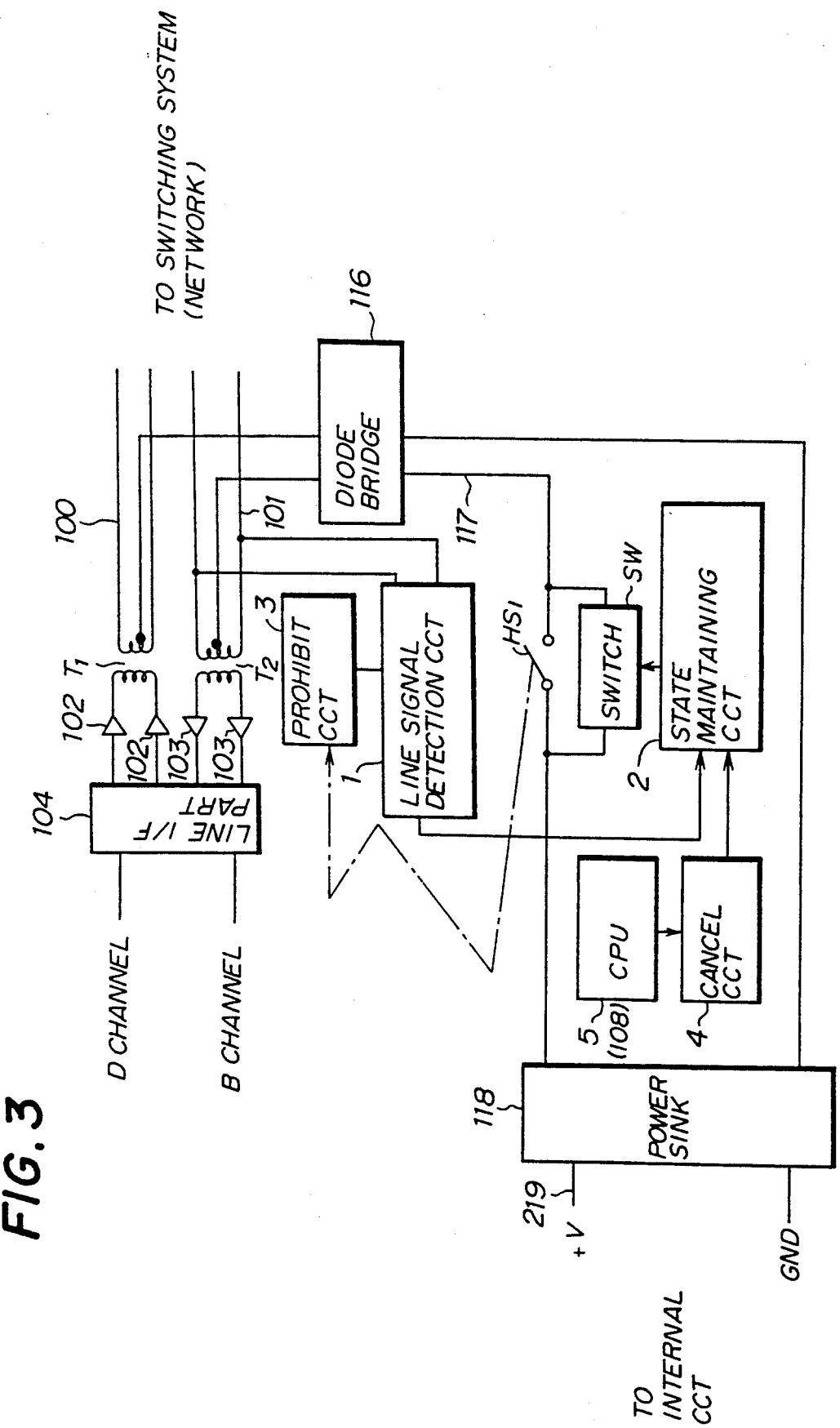
FIG. 3 is a system block diagram for explaining an operating principle of a communication terminal according to the present invention.

First, a description will be given of an operating principle of a communication terminal according to the present invention, by referring to FIG. 3. In FIG. 3, those parts which are basically the same as those corresponding parts in FIG. 2 are designated by the same reference numerals.

In FIG. 3, a switch SW is connected in parallel to a hook switch HS1. The signal line 100 is coupled to the line interface part 104 via the transformer T1 and the drivers 102, and the signal line 101 is coupled to the line interface part 104 via the transformer T2 and the receivers 103. These signal lines 100 and 101 couple the communication terminal to a communication network (not shown) via a switching system (not shown). The signal lines 100 and 101 are also coupled to the power input line 117 via the diode bridge 116 and parallel connection of the switches SW and HS1, and the power input line 117 is connected to the power sink 118. The power sink 118 is used when the power is down on the communication network side and supplies the power via the power input line 219.

A line signal detection circuit 1 detects a signal on the signal line 101. A state maintaining circuit 2 closes the switch SW and carries out a maintaining operation to maintain the switch SW in the closed state when the line signal detection circuit 1 detects a signal on the signal line 101. As a result, power is supplied from the switching system to the power sink 118 via the power input line 118. A prohibit circuit 3 prohibits the line signal detection of the line signal detection circuit 1 in response to the closing operation of the hook switch HS1. A cancel circuit 4 cancels the maintaining operation of the state maintaining circuit 2 in response to a signal which is received from a controller 5 when the hook switch HS1 is open.

Figure 4:
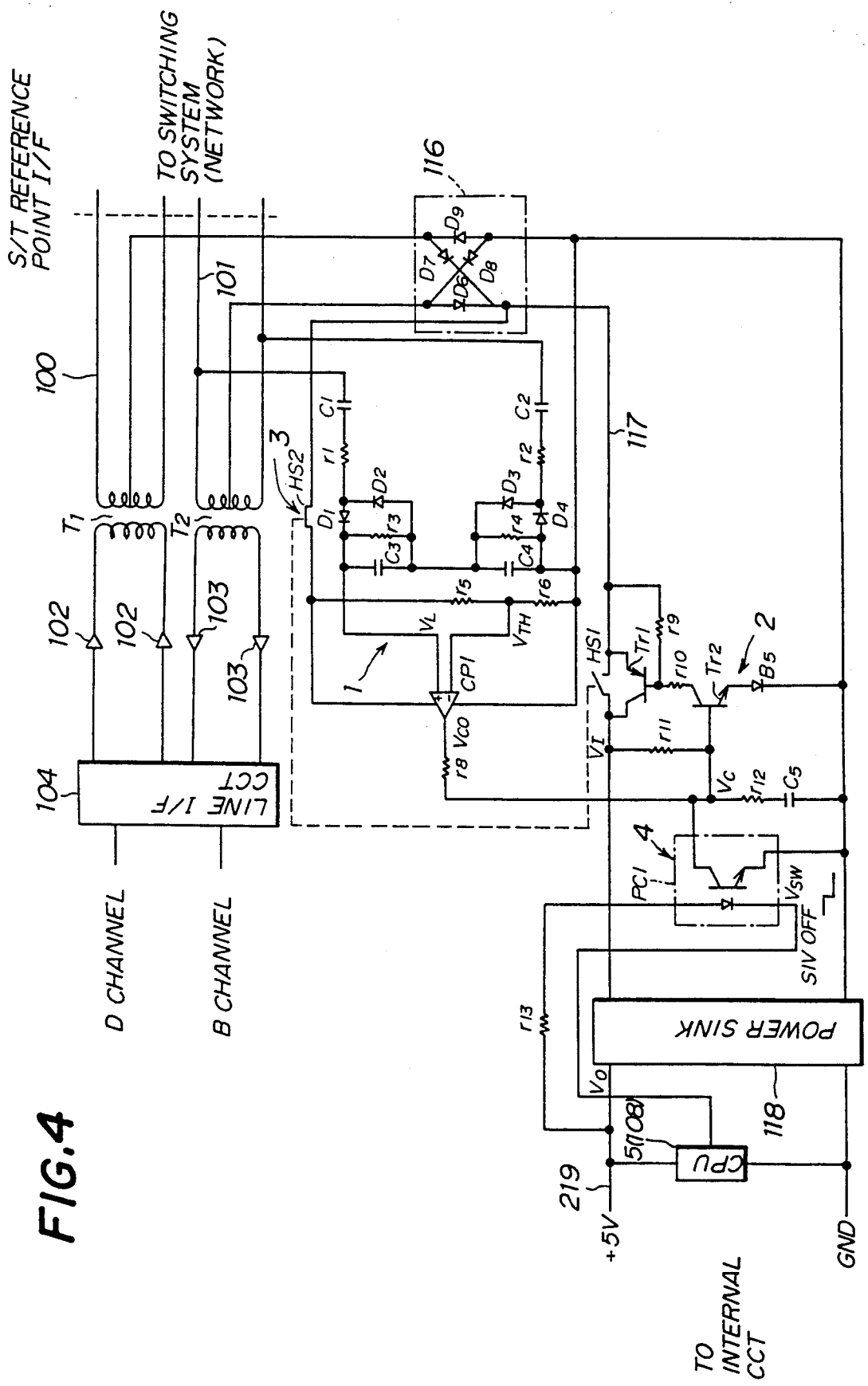
FIG. 4 is a system block diagram showing a first embodiment of the communication terminal according to the present invention.

Next, a description will be given of a first embodiment of the communication terminal according to the present invention, by referring to FIG. 4. In this embodiment, the present invention is applied to an ISDN terminal. In FIG. 4, those parts which are basically the same as those corresponding parts in FIG. 3 are designated by the same reference numerals.

A switching transistor Tr1 is connected in parallel to the hook switch HS1. The signal line 100 is coupled to the line interface part 104 via the transformer T1 and the drivers 102, and the signal line 101 is coupled to the line interface part 104 via the transformer T2 and the receivers 103. These signal lines 100 and 101 couple the ISDN terminal to an ISDN (not shown) via a switching system (not shown). The signal lines 100 and 101 are also coupled to the power input line 117 via the diode bridge 116 and the parallel connection of the hook switch HS1 and the switching transistor Tr1, and the power input line 117 is connected to the power sink 118. The diode bridge 116 includes diodes D6 through D9. For example, a semiconductor switching element such as a field effect transistor (FET) may be used for the switching transistor Tr1.

The line interface part 104 has the same construction as the line interface part 104 shown in FIG. 2. In other words, the line interface part 104 has a frame disassembly/assembly part, a CPU interface and a B channel selector. The D channel is transmitted and received between the CPU interface of the line interface part 104 and each of a CPU 108, a RAM and a ROM via a data bus. The B1 and B2 channels are transmitted and received between the B channel selector of the line interface part 104 and a handset via a coder/decoder, a sending amplifier and a receiving amplifier.

As described above, the signal detection circuit 1 detects the signal on the signal line 101. The line signal detection circuit 1 shown in FIG. 4 includes diodes D1 through D4, resistors r1 through r6 and r8, capacitors C1 through C4 and a comparator CP1 which are connected as shown. The level of the input signal on the signal line 101 is amplified to approximately two times by the capacitors C3 and C4, and the signal on the signal line 101 is detected by the comparator CP1 which uses a threshold voltage $V_{TH}$ which is a divided voltage determined by the resistors r5 and r6.

When the line signal detection circuit 1 detects the signal on the signal line 101, the state maintaining circuit 2 turns the switching transistor Tr1 ON and maintains the switching transistor Tr1 in the ON state. The state maintaining circuit 2 shown in FIG. 4 includes a diode D5, resistors r9 through r11, a capacitor C5, and a transistor Tr2. When the line signal detection circuit 1 detects the signal on the signal line 101, the capacitor C5 is charged and the transistor Tr2 turns ON, thereby turning the switching transistor Tr1 ON. As a result, the power is supplied to the power sink 11B so as to supply the power to the internal circuits. The resistor r11 is provided in order to prevent the switching transistor Tr1 from turning OFF when the level of the signal on the signal line 101 becomes small. As a result, the transistors Tr2 and Tr1 are maintained in the ON state.

As described above, the prohibit circuit 3 prohibits the line signal detection of the like signal detection circuit 1 in response to the closing operation of the hook switch HS1. The prohibit circuit 3 includes a sub hook switch HS2 which is linked to the hook switch HS1 and opens in response to the closing operation of the hook switch HS1. Hence, the supply of power to the comparator CP1 is cut off when the sub hook switch HS2 is open and the loss of power to the power sink 118 is suppressed to a minimum. In this state, the line signal detection circuit 1 does not operate, and there is absolutely no power loss at the line signal detection circuit 1.

The cancel circuit 4 cancels the maintaining operation of the state maintaining circuit 2 in response to a signal which is received from the CPU (controller) 5 when the hook switch HS1 is open. The CPU 5 controls the total operation of the ISDN terminal. The cancel circuit 4 includes a photocoupler PC1. After the communication state ends or when another terminal is selected after the line signal detection, the photocoupler PC1 turns OFF (that is, disables) the state maintaining circuit 2 in response to the signal from the CPU 5. Particularly, after the communication state ends or when another terminal is selected after the line signal detection, the CPU 5 after ending all other processes supplies a switch off signal to the photocoupler PC1 to turn the photocoupler PC1 ON. This switch off signal has a voltage $V_{SW}$. As a result, the voltage $V_C$ stored in the capacitor C5 is discharged and the transistor Tr2 turns OFF. At the same time, the switching transistor Tr1 turns OFF and the state maintaining circuit 2 turns OFF. As a result, the supply of power to the internal circuits is stopped and the power consumption is suppressed to a minimum during states other than the communication state.

The four basic operations of the ISDN terminal will now be described.

1) Operation When Called:

The capacitances of the capacitors C1 and C2 and the resistances of the resistors r1 and r2 are selected to high impedances so as not to affect the input impedance of the receiver. The capacitors C1 and C2 are provided to cut the D.C. component, and the diodes D1 through D4 rectify the line signal when the receiver is called. The capacitors C3 and C4 are respectively charged with a time constant determined by the resistor r1 and the capacitor C3 and a time constant determined by the resistor r2 and the capacitor C4. The input voltage is amplified to approximately two times by the capacitors C3 and C4 and is supplied to the comparator CP1 as a line input voltage $V_L$. The threshold voltage $V_{TH}$ is determined by the resistors r5 and r6 and is supplied to the comparator CP1. When the line input voltage $V_L$ exceeds the threshold voltage $V_{TH}$, the comparator CP1 outputs an output voltage $V_{CO}$.

When the comparator CP1 outputs the output voltage $V_{CO}$, the capacitor C5 is charged with a time constant determined by the resistors r8 and r12. When the voltage $V_C$ of the capacitor C5 reaches a predetermined voltage level, the transistor Tr2 turns ON, and at the same time, the switching transistor Tr1 turns ON. When the switching transistor Tr1 turns ON, a power sink input voltage $V_I$ is supplied to the power sink 118. In this state, the resistor r11, the transistor Tr2 and the diode D5 cooperate to maintain the ON state of the switching transistor Tr1. Hence, even when the signal on the signal line 101 becomes small and the comparator CP1 turns OFF, the switching transistor Tr1 is maintained in the ON state and the power sink input voltage $V_I$ continues to be supplied to the power sink 118. For this reason, stable power is supplied to the internal circuits. The power sink 118 supplies a power sink output voltage $V_O$ to the internal circuits.

Because the switch off signal (voltage $V_{SW}$) from the CPU 5 has a high level in this state, the photocoupler PC1 remains OFF, that is, will not operate.

Thereafter, the layer 1 is started and it becomes possible to make a communication. When the hook switch HS1 turns ON responsive to an off-hook, the sub hook switch HS2 turns OFF and the line signal detection circuit 1 is turned OFF. As a result, it is possible to keep the power supply to a minimum in the communication state.

Figure 5:
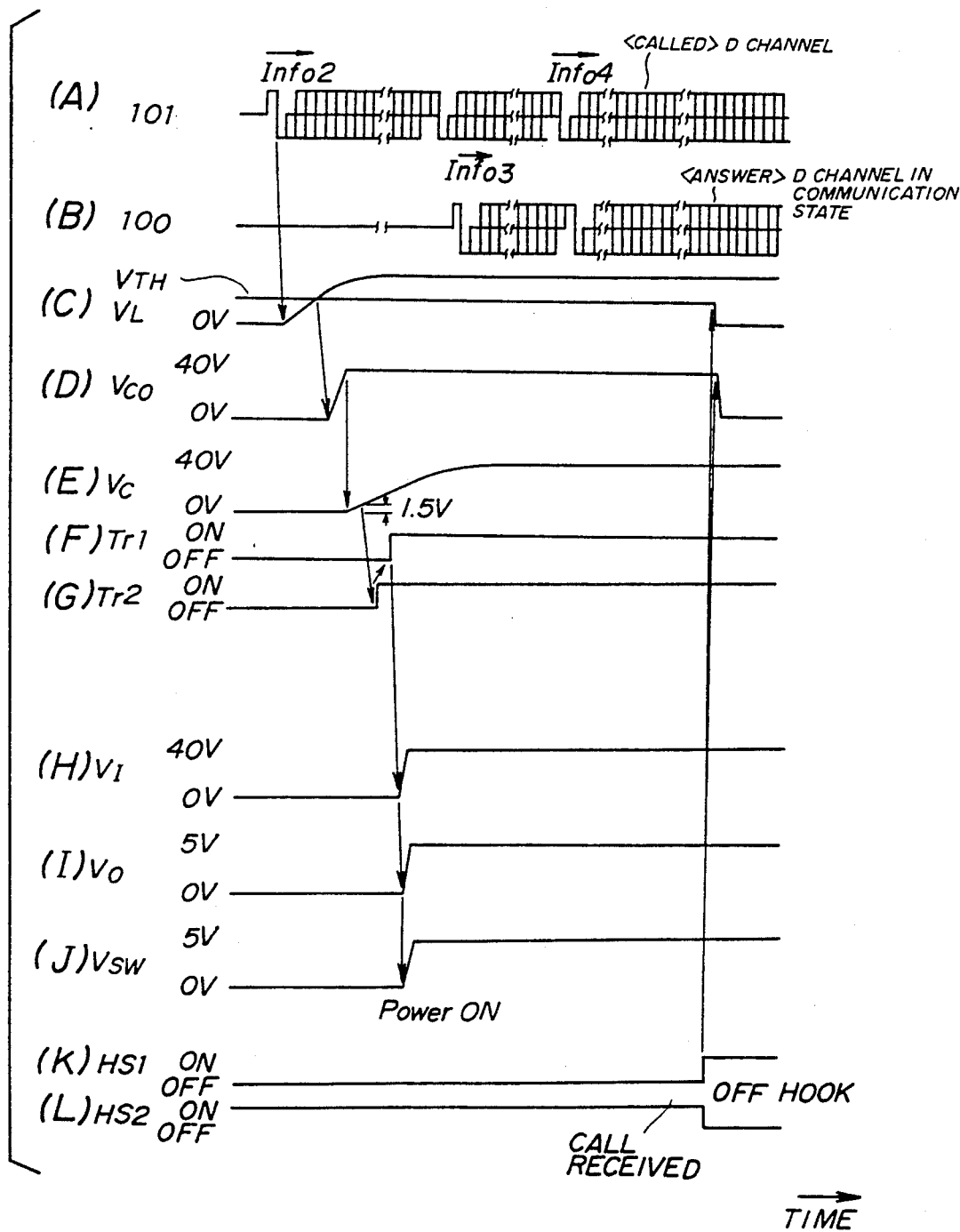
FIG. 5 is a timing chart showing various timings when the ISDN terminal is called.
Figure 6:
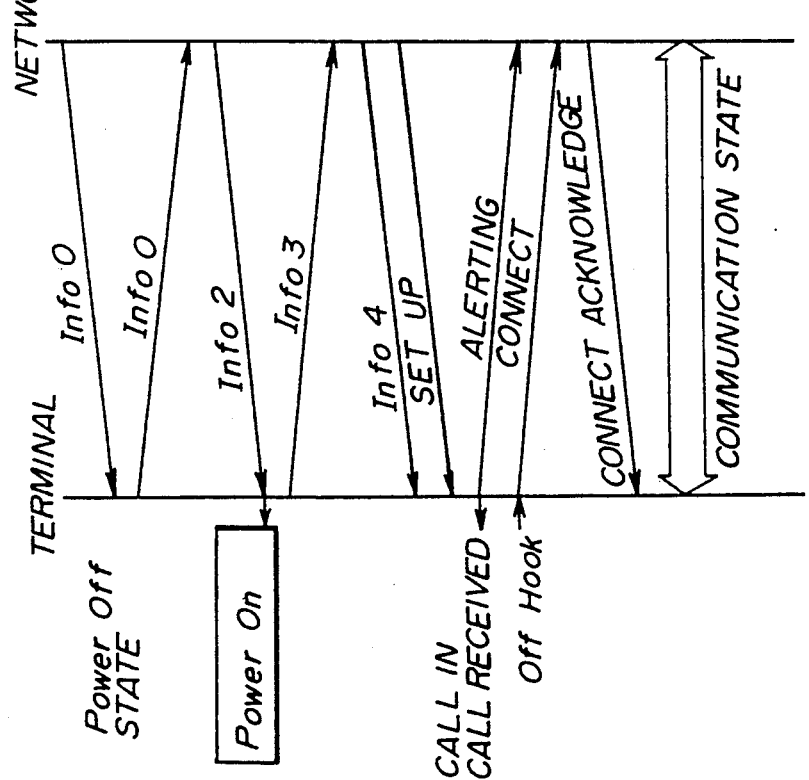
FIG. 6 shows a sequence of operations which are carried out when the ISDN terminal is called.

FIG. 5 is a timing chart showing the various timings when the ISDN terminal is called, and FIG. 6 shows a sequence of operations which are carried out when the ISDN terminal is called.

FIG. 5(A) shows the signal received on the signal line 101 and FIG. 5(B) shows the signal transmitted on the signal line 100. FIG. 5(C) shows the line input voltage $V_L$ and the threshold voltage $V_{TH}$ which are supplied to the comparator CP1, and FIG. 5(D) shows the output voltage $V_{CO}$ of the comparator CP1. FIG. 5(E) shows the voltage $V_C$ across the capacitor C5. FIG. 5(F) shows the ON/OFF state of the switching transistor Tr1, and FIG. 5(G) shows the ON/OFF state of the transistor Tr2. FIG. 5(H) shows the power sink input voltage $V_I$ supplied to the power sink 118, FIG. 5(I) shows the power sink output voltage $V_O$ output from the power sink 118, and FIG. 5(J) shows the voltage $V_{SW}$ output from the CPU 5. FIG. 5(K) shows the ON/OFF state of the hook switch HS1, and FIG. 5(L) shows the ON/OFF state of the sub hook switch HS2.

In FIG. 6, the ISDN supplies the signal Info0 to the ISDN terminal and the ISDN terminal supplies the signal Info0 to the ISDN. In this state, the power is OFF. Then the ISDN supplies the signal Info2 to the ISDN terminal and the power turns ON. The ISDN terminal supplies the signal Info3 in response to the signal Info2. Thereafter, the ISDN supplies the signal Info4 to the ISDN terminal and makes a set up with respect to the ISDN terminal. The ISDN terminal makes an alerting and a connect by an off-hook. The ISDN makes a connect acknowledge and a communication state is reached between the ISDN and the ISDN terminal.

2) Operation When Calling:

In this case, the hook switch HS1 turns ON and the sub hook switch HS2 turns OFF responsive to an off-hook. Hence the line signal detection circuit 1 is turned OFF and it is possible to keep the power supply to a minimum. In addition, the state maintaining circuit 2 operates similarly as in the case of the called state described above to maintain the ON state of the switching transistor Tr1, and the photocoupler PC1 of the cancel circuit 4 is also OFF.

Accordingly, the voltages $V_I$ and $V_O$ are successively supplied and the layer 1 is started so that it becomes possible to make a communication.

Figure 8:
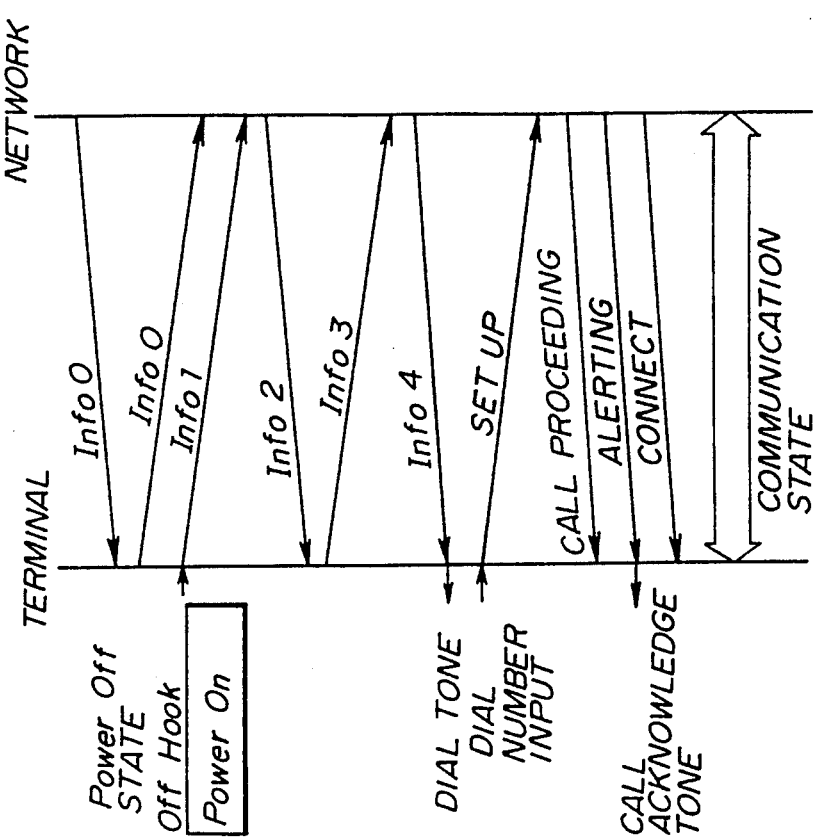
FIG. 8 shows a sequence of operations which are carried out when the ISDN terminal is calling.

FIG. 7 is a timing chart showing the various timings when the ISDN terminal is calling, and FIG. 8 shows a sequence of operations which are carried out when the ISDN terminal is calling.

FIG. 7(A) shows the signal received on the signal line 101 and FIG. 7(B) shows the signal transmitted on the signal line 100. FIG. 7(C) shows the line input voltage $V_L$ and the threshold voltage $V_{TH}=0$ which are supplied to the comparator CP1, and FIG. 7(D) shows the output voltage $V_{CO}$ of the comparator CP1. FIG. 7(E) shows the voltage $V_C$ across the capacitor C5. FIG. 7(F) shows the ON/OFF state of the switching transistor Tr1, and FIG. 7(G) shows the ON/OFF state of the transistor Tr2. FIG. 7(H) shows the power sink input voltage $V_I$ supplied to the power sink 118, FIG. 7(I) shows the power sink output voltage $V_O$ output from the power sink 118, and FIG. 7(J) shows the voltage $V_{SW}$ output from the CPU 5. FIG. 7(K) shows the ON/OFF state of the hook switch HS1, and FIG. 7(L) shows the ON/OFF state of the sub hook switch HS2.

In FIG. 8, the ISDN supplies the signal Info0 to the ISDN terminal and the ISDN terminal supplies the signal Info0 to the ISDN. In this state, the power is OFF. Then, the power turns ON and the ISDN terminal supplies the signal Info1 to the ISDN, and the ISDN supplies the signal Info2 to the ISDN terminal. The ISDN terminal supplies the signal Info3 in response to the signal Info2. Thereafter, the ISDN supplies the signal Info4 to the ISDN terminal and the ISDN terminal makes a set up with respect to the ISDN. The ISDN makes a call proceeding, an alerting and a connect, and a communication state is reached between the ISDN and the ISDN terminal.

3) Operation When Disconnected From ISDN Side:

In this case, an on-hook is made after a disconnect signal is received from the ISDN side. In this state, the hook switch HS1 is OFF and the sub hook switch HS2 is ON.

However, because the state maintaining circuit 1 is ON, the transistors Tr1 and Tr2 will not turn OFF and the power is supplied to the internal circuits. Thereafter, the layer 1 becomes inactive and no line is detected on the signal line.

When the CPU 5 ends all processes and sends a low-level switch off signal (voltage $V_{SW}$) to the photocoupler PC1, the photocoupler PC1 turns ON. In this state, the voltage $V_C$ stored in the capacitor C5 is discharged to the ground level (GND) with a time constant determined by the resistor r12 and the capacitor C5. As a result, the transistors Tr2 and Tr1 successively turn OFF and the power supply to the internal circuits is stopped. Therefore, it is possible to suppress the power consumption during states other than the communication state.

Figure 9:
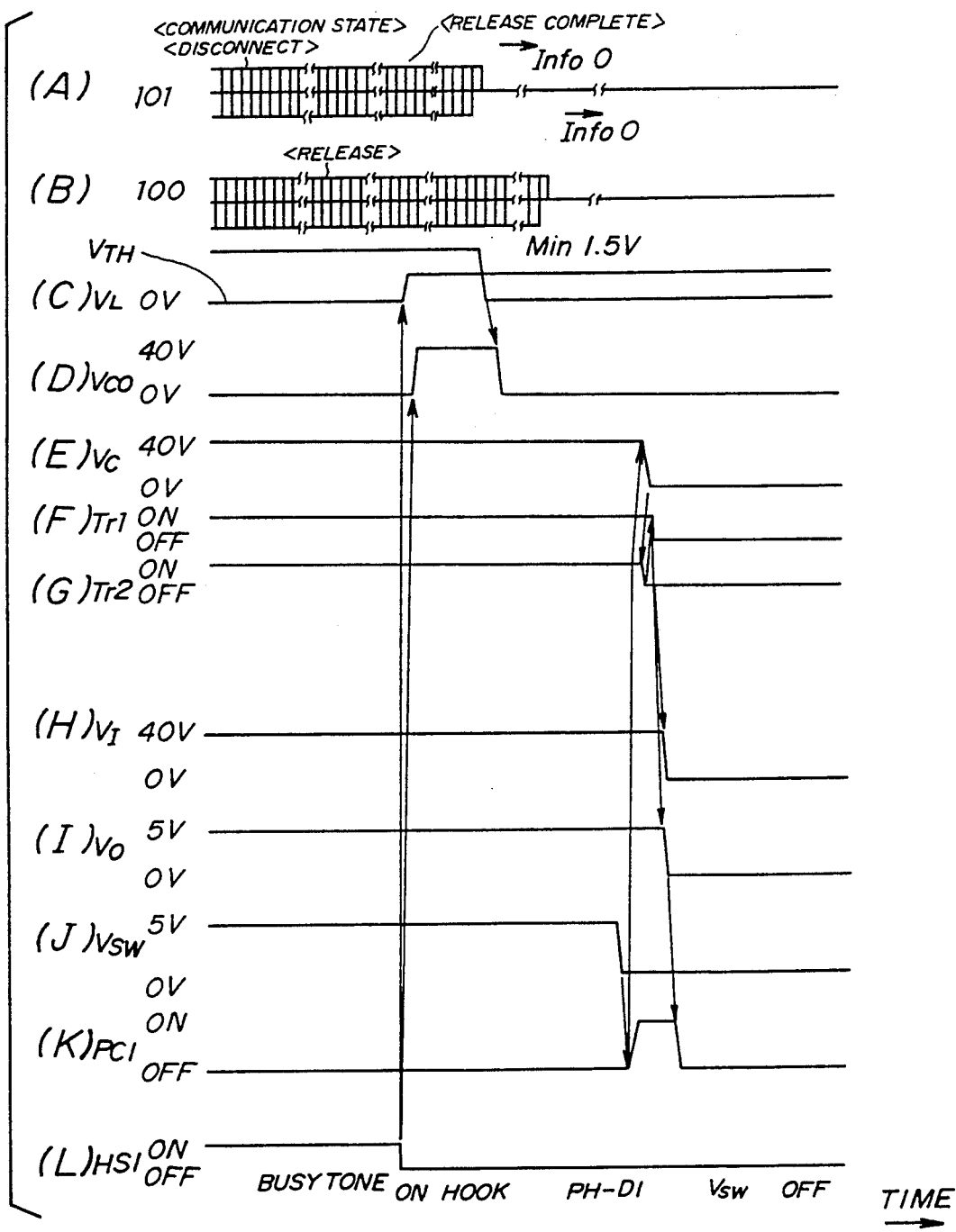
FIG. 9 is a timing chart showing various timings when the disconnection is made from the ISDN side.
Figure 10:
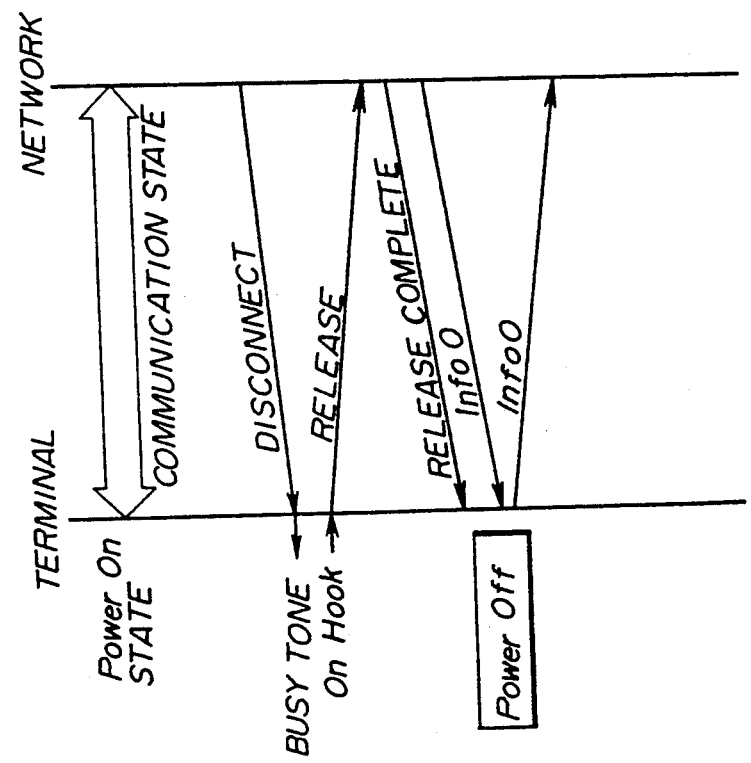
FIG. 10 shows a sequence of operations which are carried out when the disconnection is made from the ISDN side.

FIG. 9 is a timing chart showing the various timings when the disconnection is made from the ISDN side, and FIG. 10 shows a sequence of operations which are carried out when the disconnection is made from the ISDN side.

FIG. 9(A) shows the signal received on the signal line 101 and FIG. 9(B) shows the signal transmitted on the signal line 100. FIG. 9(C) shows the line input voltage $V_L$ and the threshold voltage $V_{TH}$ which are supplied to the comparator CP1, and FIG. 9(D) shows the output voltage $V_{CO}$ of the comparator CP1. FIG. 9(E) shows the voltage $V_C$ across the capacitor C5. FIG. 9(F) shows the ON/OFF state of the switching transistor Tr1, and FIG. 9(G) shows the ON/OFF state of the transistor Tr2. FIG. 9(H) shows the power sink input voltage $V_I$ supplied to the power sink 118, FIG. 9(I) shows the power sink output voltage $V_O$ output from the power sink 118, and FIG. 9(J) shows the voltage $V_{SW}$ output from the CP1; 5. FIG. 9(K) shows the ON/OFF state of the photocoupler PC1, and FIG. 9(L) shows the ON/OFF state of the hook switch HS1.

In FIG. 10, the power is ON in the communication state. The ISDN disconnects with respect to the ISDN terminal, and the ISDN terminal releases with respect to the ISDN. Hence, the ISDN makes a release complete and sends the signal Info0. The power is turned OFF in response to the signal Info0 and the ISDN terminal sends the signal Info0 to the ISDN.

4) Operation When Disconnected From ISDN Terminal Side:

In this case, the hook switch HS1 turns OFF and the sub hook switch HS2 turns ON responsive to an on-hook. However, the power supply is made because the state maintaining circuit 1 is ON and operates. Thereafter, the operation is similar to the case described above when the disconnection is made from the ISDN side. When the layer 1 becomes inactive and the CPU 5 ends all processes, the CPU 5 sends a low-level switch off signal (voltage $V_{SW}$) to the photocoupler PC1 and the photocoupler PC1 turns ON. In this state, the voltage $V_C$ stored in the capacitor C5 is discharged to the ground level (GND) with a time constant determined by the resistor r12 and the capacitor C5. As a result, the transistors Tr2 and Tr1 successively turn OFF and the power supply to the internal circuits is stopped. Therefore, it is possible to suppress the power consumption during states other than the communication state.

Figure 12:
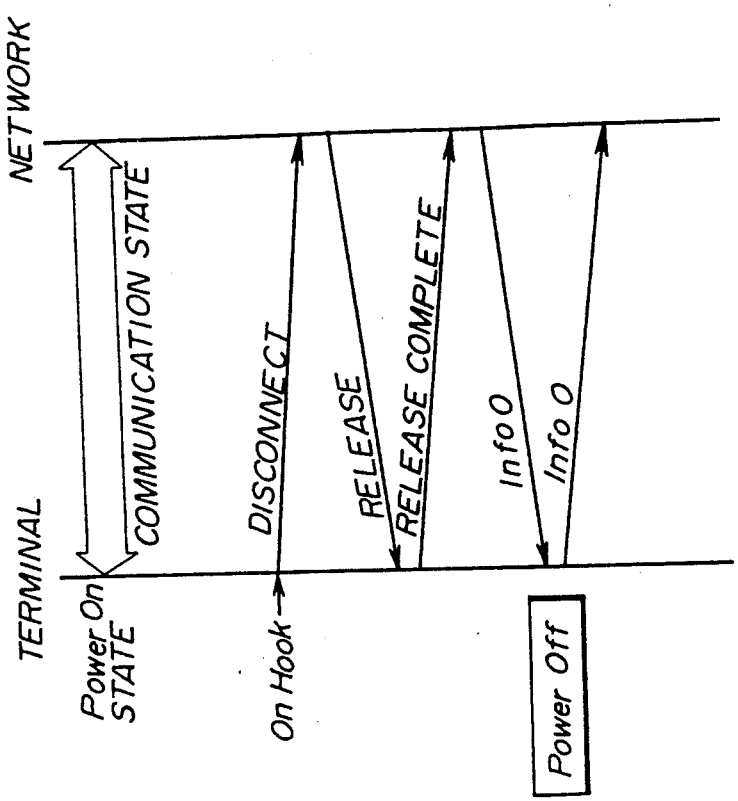
FIG. 12 shows a sequence of operations which are carried out when the disconnection is made from the ISDN terminal side.

FIG. 11 is a timing chart showing the various timings when the disconnection is made from the ISDN terminal side, and FIG. 12 shows a sequence of operations which are carried out when the disconnection is made from the ISDN terminal side.

FIG. 11(A) shows the signal received on the signal line 101 and FIG. 11(B) shows the signal transmitted on the signal line 100. FIG. 11(C) shows the line input voltage $V_L$ and the threshold voltage $V_{TH}$ which are supplied to the comparator CP1, and FIG. 11(D) shows the output voltage $V_{CO}$ of the comparator CP1. FIG. 11(E) shows the voltage $V_C$ across the capacitor C5. FIG. 11(F) shows the ON/OFF state of the switching transistor Tr1, and FIG. 11(G) shows the ON/OFF state of the transistor Tr2. FIG. 11(H) shows the power sink input voltage $V_I$ supplied to the power sink 118, FIG. 11(I) shows the power sink output voltage $V_O$ output from the power sink 118, and FIG. 11(J) shows the voltage $V_{SW}$ output from the CPU 5. FIG. 11(K) shows the ON/OFF state of the photocoupler PC1, and FIG. 11(L) shows the ON/OFF state of the hook switch HS1.

In FIG. 12, the power is ON in the communication state. The ISDN terminal disconnects with respect to the ISDN, and the ISDN releases with respect to the ISDN terminal. Hence, the ISDN terminal makes a release complete. The ISDN sends the signal Info0, and the power is turned OFF in response to the signal Info0. The ISDN terminal sends the signal Info0 to the ISDN.

Therefore, the power consumption is kept down to a minimum when no signal is received on the signal line, and the power is supplied to the internal circuits only when a signal is received on the signal line.

FIG. 13 shows the structure of one frame of layer 1. In FIG. 13, F denotes a framing bit, L denotes a DC balancing bit, D denotes a D-channel bit, E denotes a D-echo-channel bit, FA denotes an auxiliary framing bit, N denotes a bit which is set to a binary value N=FA, B1 denotes a bit within the B-channel 1, B2 denotes a bit within the B-channel 2, A denotes a bit used for activation, S denotes a spare bit for future standardization, and M denotes a multiframing bit. In addition, a dot indicates a part of a frame which is independently DC balanced. The FA bit in the direction TE to NT1 (or NT2) is used as a Q bit for every 5 frames when the Q-channel capability is provided. The 2-bit offset is obtained at the output point of TE. A corresponding offset at the NT1 (or NT2) may vary considerably depending on the delay and connection of the interface cable.

FIG. 14 is a diagram for explaining the definition of the signal Info.

Figure 15:
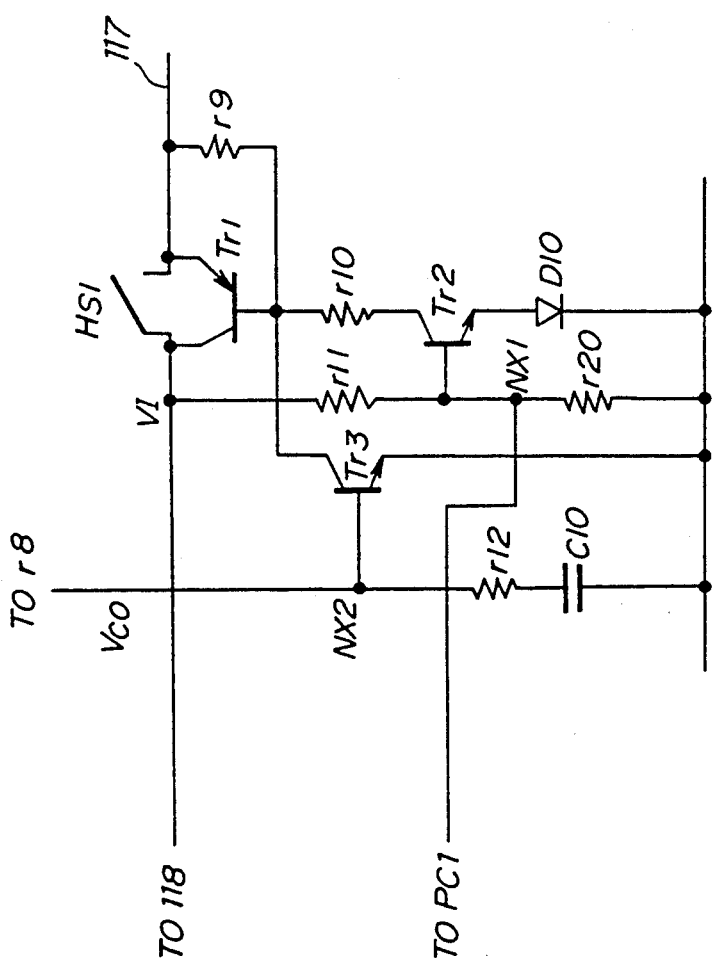
FIG. 15 is a circuit diagram showing another embodiment of the state maintaining circuit.

Next, a description will be given of another embodiment of the state maintaining circuit 2 shown in FIG. 3, by referring to FIG. 15. In FIG. 15, those parts which are basically the same as those corresponding parts in FIG. 4 are designated by the same reference numerals, and a description thereof will be omitted.

In FIG. 15, the state maintaining circuit 2 includes transistors Tr2 and Tr3, resistors r9 through r12 and r20, a capacitor C10 and a diode D10. A node NX1 is connected to the photocoupler PC1 of the cancel circuit 4. A node NX2 is connected to the resistor r8 of the line signal detection circuit 1. In this embodiment, when the line signal detection circuit 1 detects the signal on the signal line 101 and the comparator CP1 outputs the voltage corresponding to the high level, the capacitor C10 is charged and the transistor Tr3 turns ON. As a result, a current flows through the resistor r9 and the transistor Tr3, and the transistor Tr1 turns ON. The power sink input voltage $V_I$ causes a current to flow through the resistors r11 and r20, and the transistor Tr2 turns ON. When the transistor Tr2 is ON, a current flows through the resistors r9 and r10, the transistor Tr2 and the diode D10. Thus, the transistor Tr1 turns ON, and since the power sink input voltage $V_I$ becomes high level via the transistor Tr1, the current flows through the resistors r11 and r20 and the transistor Tr2 remains ON even after the output voltage $V_{CO}$ of the comparator CP1 falls to the low level and the transistor Tr3 turns OFF. The transistor Tr2 turns OFF when the photocoupler PC1 of the cancel circuit 4 turns ON and the potential at the node NX1 decreases. As a result, the state maintaining operation of the state maintaining circuit 2 is disabled by the cancel circuit 4.

Figure 16:
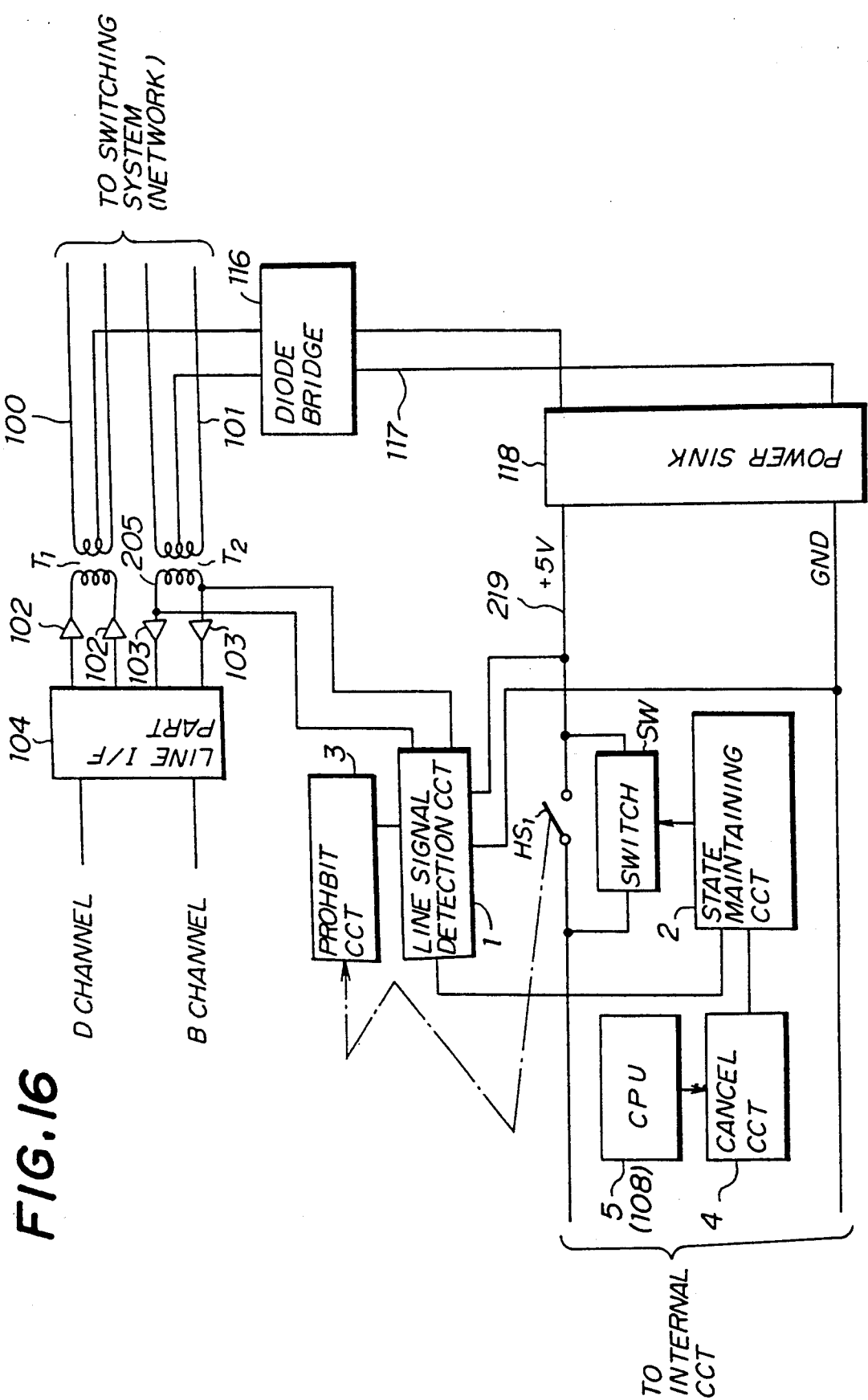
FIG. 16 is a system block diagram showing a second embodiment of the communication terminal according to the present invention.

Next, a description will be given of a second embodiment of the communication terminal according to the present invention, by referring to FIG. 16. In FIG. 16, those parts which are basically the same as those corresponding parts in FIG. 3 are designated by the same reference numerals, and a description thereof will be omitted.

In this embodiment, the line signal detection circuit 1 is connected to a line 205 at inputs of the drivers 102 instead of being connected to the line 101. In other words, the line signal detection circuit 1 is coupled to the primary windings of the transformer T2 in the first embodiment, but the line signal detection circuit 1 is coupled to the secondary windings of the transformer T2 in this second embodiment.

In addition, in this second embodiment, the power sink 118 is coupled to the lines 100 and 101 via the diode bridge 116, and the switch SW, the state maintaining circuit 2 and the cancel circuit 4 are coupled to the power input line 219 on the output side of the power sink 118. The same circuits shown in FIG. 4 may be used in this embodiment, although the circuit constants are selected differently between the first and second embodiments. In addition, the operation of this embodiment is basically the same as that of the first embodiment described in conjunction with FIGS. 3 and 4. However, in this embodiment, the comparator CP1 of the line signal detection circuit 1 is not driven by the voltage of 40 V and is driven by a voltage of 5 V. As a result, an inexpensive comparator may be used for the comparator CP1 when compared to the first embodiment. Furthermore, the transistors need not operate at the large voltage of 40 V, and it is possible to use inexpensive transistors which are not bulky. The effects of this second embodiment are the same as those obtainable in the first embodiment.

In the described embodiments, the present invention is applied to the ISDN terminal. However, it is of course possible to apply the present invention to any kind of communication terminal which is coupled to a communication network via a switching system.

Further, the present invention is not limited to these embodiments, but various variations and modifications may be made without departing from the scope of the present invention.

What is claimed is:

1. A communication terminal which is coupled to a communication network via transmitting and receiving signal lines and a switching system, said communication terminal comprising:
   a power input line coupled to the transmitting and receiving signal lines;
   a power sink for supplying power;
   switching means coupled between said power input line and said power sink;
   a hook switch coupled between said power input line and said power sink in parallel to said switching means;
   detection circuit means coupled to the receiving signal line for detecting a signal on the receiving signal line;
   state maintaining circuit means coupled to said switching means and said detection circuit means for closing said switching means and for maintaining said switching means in a closed state by carrying out a state maintaining operation when a signal is detected by said detection circuit means; and
   prohibit circuit means coupled to said detection circuit means for prohibiting a signal detection of said detection circuit means.

2. The communication terminal as claimed in claim 1, wherein said prohibit circuit means is coupled to said hook switch and prohibits the signal detection of said detection circuit means in response to a closing operation of said hook switch.

3. The communication terminal as claimed in claim 2, wherein said detection circuit means includes amplifier circuit means for amplifying the signal on the receiving signal line and comparator means for detecting the signal on the receiving signal line by comparing the amplified signal with a threshold voltage.

4. The communication terminal as claimed in claim 3, wherein said prohibit circuit means includes a sub hook switch which is linked to said hook switch and cuts off a supply of power to said comparator means when open, said sub hook switch opening when said hook switch closes.

5. The communication terminal as claimed in claim 1, which further comprises control means including means for controlling operations of said communication terminal and means for outputting a switch off signal, and cancel circuit means coupled to said control means for supplying a signal for cancelling the state maintaining operation of said state maintaining circuit means responsive to the switch off signal from said control means when said hook switch is open.

6. The communication terminal as claimed in claim 1, which further comprises transformers having primary windings coupled to said transmitting and receiving signal lines, drivers and receivers respectively coupled to said transmitting and receiving signal lines via to secondary windings of said transformers, and line interface means coupled to said drivers and receivers, said detection circuit means being connected to the primary windings of the transformer which is coupled to the receiving line.

7. The communication terminal as claimed in claim 1, wherein said detection circuit means includes amplifier circuit means for amplifying the signal on the receiving signal line and comparator means for detecting the signal on the receiving signal line by comparing the amplified signal with a threshold voltage.

8. The communication terminal as claimed in claim 7, wherein said amplifier circuit means amplifies the signal on the receiving signal line with an amplification of approximately two.

9. The communication terminal as claimed in claim 1, which further comprises diode bridge circuit means coupled between said power input line and the transmitting and receiving signal lines.

10. The communication terminal as claimed in claim 1, wherein said state maintaining circuit means includes first switching means coupled to said power input line for supplying power to said power sink by turning ON when said detection circuit means detects the signal on the receiving signal line and second switching means coupled to said first switching means for maintaining said first switching circuit ON even after said detection circuit means no longer detects the signal on the receiving signal line.

11. The communication terminal as claimed in claim 10, wherein said prohibit circuit means is coupled to said hook switch and prohibits the signal detection of said detection circuit means in response to a closing operation of said hook switch when said communication terminal is called.

12. The communication terminal as claimed in claim 10, wherein said prohibit circuit means is coupled to said hook switch and prohibits the signal detection of said detection circuit means in response to a closing operation of said hook switch when said communication terminal is calling.

13. The communication terminal as claimed in claim 10, which further comprises control means including means for controlling operations of said communication terminal and means for outputting a switch off signal when communication ends, and cancel circuit means coupled to said control means for supplying a signal for cancelling the state maintaining operation of said second switching means of said state maintaining circuit means responsive to the switch off signal from said control means when said hook switch is open after a disconnection is made from the communication network.

14. The communication terminal as claimed in claim 10, which further comprises control means including means for controlling operations of said communication terminal and means for outputting a switch off signal when communication ends, and cancel circuit means coupled to said control means for supplying a signal for cancelling the state maintaining operation of said second switching means of said state maintaining circuit means responsive to the switch off signal from said control means when said hook switch is open after a disconnection is made from said communication terminal.

15. The communication terminal as claimed in claim 1, wherein the communication network is an integrated services digital network.

16. A communication terminal which is coupled to a communication network via transmitting and receiving signal lines and a switching system, said communication terminal comprising:
a power input line coupled to the transmitting and receiving signal lines;
a power sink coupled to said power input line for supplying power from an output side thereof;
switching means coupled to the output side of said power sink;
a hook switch coupled to the output side of said power sink in parallel to said switching means;
detection circuit means coupled to the receiving signal line for detecting a signal on the receiving signal line;
state maintaining circuit means coupled to said switching means and said detection circuit means for closing said switching means and for maintaining said switching means in a closed state by carrying out a state maintaining operation when a signal is detected by said detection circuit means; and
prohibit circuit means coupled to said detection circuit means for prohibiting a signal detection of said detection circuit means.

17. The communication terminal as claimed in claim 16, wherein said prohibit circuit means is coupled to said hook switch and prohibits the signal detection of said detection circuit means in response to a closing operation of said hook switch.

18. The communication terminal as claimed in claim 17, wherein said detection circuit means includes amplifier circuit means for amplifying the signal on the receiving signal line and comparator means for detecting the signal on the receiving signal line by comparing the amplified signal with a threshold voltage.

19. The communication terminal as claimed in claim 18, wherein said prohibit circuit means includes a sub hook switch which is linked to said hook switch and cuts off a supply of power to said comparator means when open, said sub hook switch opening when said hook switch closes.

20. The communication terminal as claimed in claim 16, which further comprises control means including means for controlling operations of said communication terminal and means for outputting a switch off signal, and cancel circuit means coupled to said control means for supplying a signal for cancelling the state maintaining operation of said state maintaining circuit means responsive to the switch off signal from said control means when said hook switch is open.

21. The communication terminal as claimed in claim 16, which further comprises transformers having primary windings coupled to said transmitting and receiving signal lines, drivers and receivers respectively coupled to said transmitting and receiving signal lines via to secondary windings of said transformers, and line interface means coupled to said drivers and receivers, said detection circuit means being coupled to the secondary windings of the transformer which is coupled to the receiving line.

22. The communication terminal as claimed in claim 21, wherein said detection circuit means is connected to input sides of said receivers.

23. The communication terminal as claimed in claim 16, wherein said detection circuit means includes amplifier circuit means for amplifying the signal on the receiving signal line and comparator means for detecting the signal on the receiving signal line by comparing the amplified signal with a threshold voltage.

24. The communication terminal as claimed in claim 23, wherein said amplifier circuit means amplifies the signal on the receiving signal line with an amplification of approximately two.

25. The communication terminal as claimed in claim 16, which further comprises diode bridge circuit means coupled to said power input line between said power sink and the transmitting and receiving signal lines.

26. The communication terminal as claimed in claim 16, wherein said state maintaining circuit means includes first switching means coupled to said power input line for enabling a power supply from said power sink by turning ON when said detection circuit means detects the signal on the receiving signal line and second switching means coupled to said first switching means for maintaining said first switching circuit ON even after said detection circuit means no longer detects the signal on the receiving signal line.

27. The communication terminal as claimed in claim 26, wherein said prohibit circuit means is coupled to said hook switch and prohibits the signal detection of said detection circuit means in response to a closing operation of said hook switch when said communication terminal is called.

28. The communication terminal as claimed in claim 26, wherein said prohibit circuit means is coupled to said hook switch and prohibits the signal detection of said detection circuit means in response to a closing operation of said hook switch when said communication terminal is calling.

29. The communication terminal as claimed in claim 26, which further comprises control means including means for controlling operations of said communication terminal and means for outputting a switch off signal when communication ends, and cancel circuit means coupled to said control means for supplying a signal for cancelling the state maintaining operation of said second switching means of said state maintaining circuit means responsive to the switch off signal from said control means when said hook switch is open after a disconnection is made from the communication network.

30. The communication terminal as claimed in claim 26, which further comprises control means including means for controlling operations of said communication terminal and means for outputting a switch off signal when communication ends, and cancel circuit means coupled to said control means for supplying a signal for cancelling the state maintaining operation of said second switching means of said state maintaining circuit means responsive to the switch off signal from said control means when said hook switch is open after a disconnection is made from said communication terminal.

31. The communication terminal as claimed in claim 16, wherein the communication network is an integrated services digital network.

* * * * *